United States Patent [19]

Poulos

[11] 4,244,577
[45] Jan. 13, 1981

[54] DIAGNOSTIC MEMORY SKILL GAME AND METHOD

[76] Inventor: Mildred S. Poulos, 1834 Taper Dr., Upper St. Clair, Pa. 15241

[21] Appl. No.: 9,867

[22] Filed: Feb. 7, 1979

[51] Int. Cl.³ .............................................. A63F 3/00
[52] U.S. Cl. .................................................. 273/236
[58] Field of Search ................ 35/8 R, 9 R, 22 R, 32, 35/33, 35 R, 35 H; 273/269, 272, 273, 283, 302, 308, 236

[56] References Cited

U.S. PATENT DOCUMENTS

| | | | |
|---|---|---|---|
| 378,866 | 3/1888 | Wren | 35/33 |
| 1,099,009 | 6/1914 | Bennett | 35/33 |
| 3,267,590 | 8/1966 | Browning | 273/272 X |
| 3,876,206 | 4/1975 | Moura | 273/273 |
| 4,090,717 | 5/1978 | Rossetti | 273/302 |

Primary Examiner—William H. Grieb

[57] ABSTRACT

A diagnostic educational memory skill game and method for developing, improving, and diagnosing memory skills comprising a game board assembly and cards. The game board assembly includes a game board which has a plurality of player areas with a common area disposed therebetween and extensions of said game board. Each player area comprises a pair of rows of spaces, one row represents the recycling area while the other represents the mastered area. The cards have information printed thereon and comprise question cards, center cards, and bonus cards. When a question card is drawn, a player must answer a question relating to that question card. If his response is correct, the question card is placed in his mastered area; if incorrect, the question card is placed in his recycling area. When a center card is placed in the common area, each question asked relates to the information on both the displayed center card and the question cards drawn. If a bonus card is drawn, the player must make fresh responses for each question card in his player area, and the question cards are repositioned according to the acceptability of the responses. The object of the game is to respond acceptably to each question so that all of a player's question cards are placed in his mastered area before the teacher's question cards are placed likewise. During the game, the student players are motivated through competition with the teacher, and the teacher diagnoses student memory skill deficiencies and prescribes correction procedures.

10 Claims, 15 Drawing Figures

U.S. Patent    Jan. 13, 1981    Sheet 1 of 2    4,244,577
FIG. 1
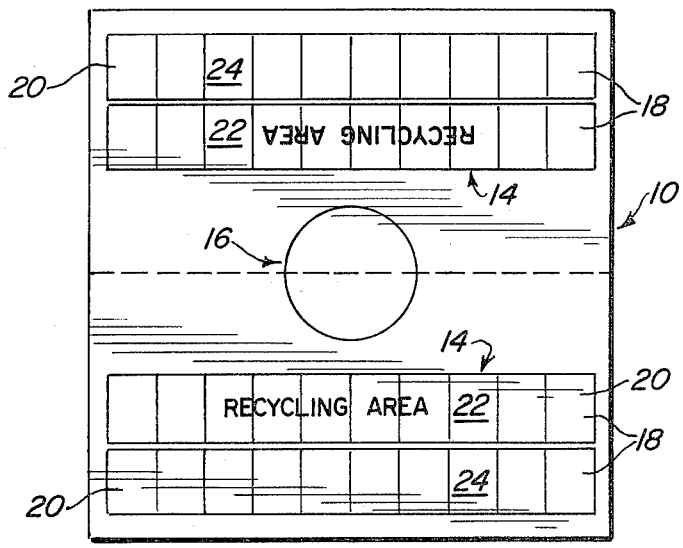
FIG. 2
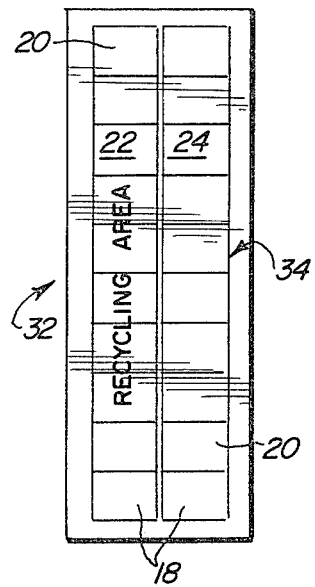
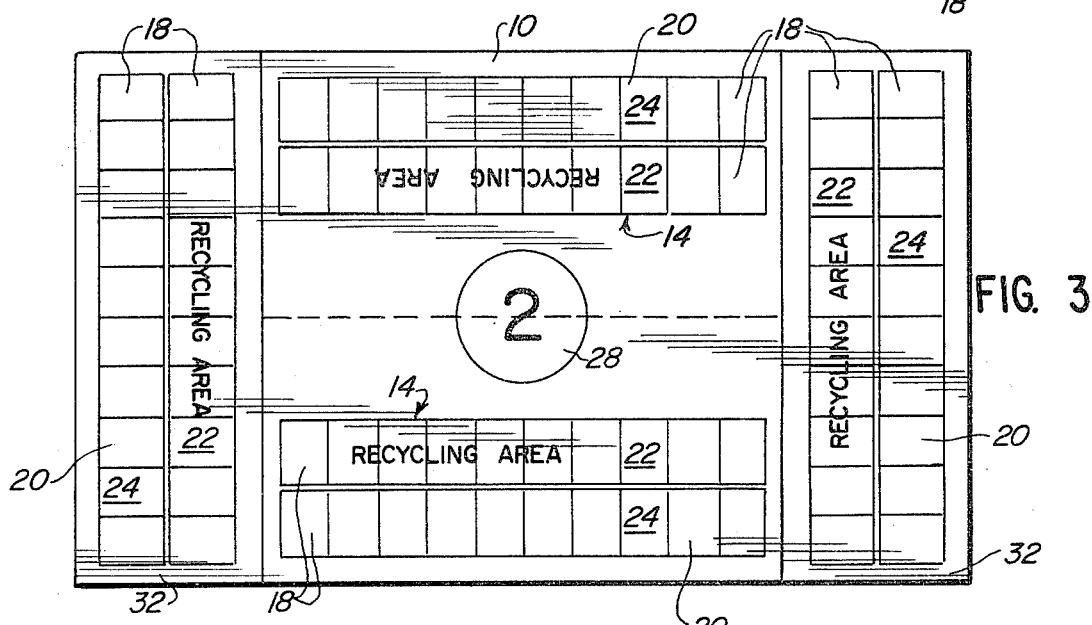
FIG. 3
FIG. 4
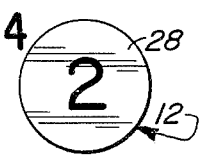
FIG. 5
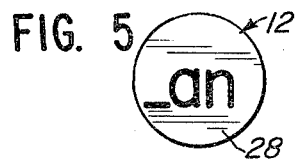
FIG. 6
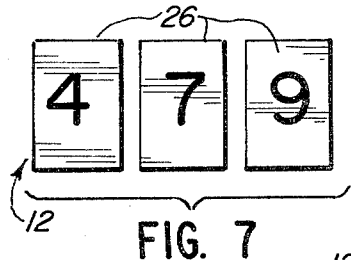
FIG. 7
FIG. 8
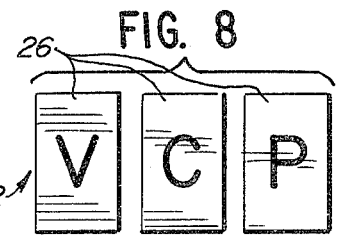
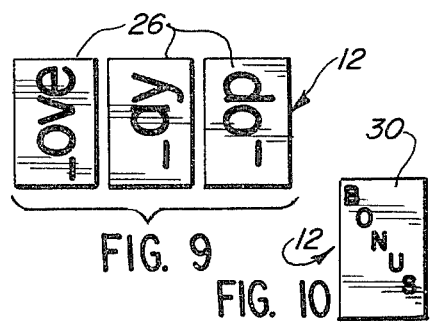
FIG. 9
FIG. 10

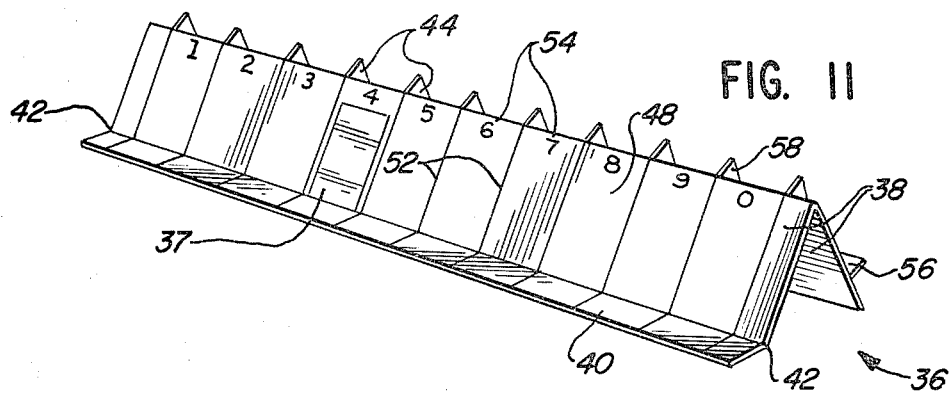
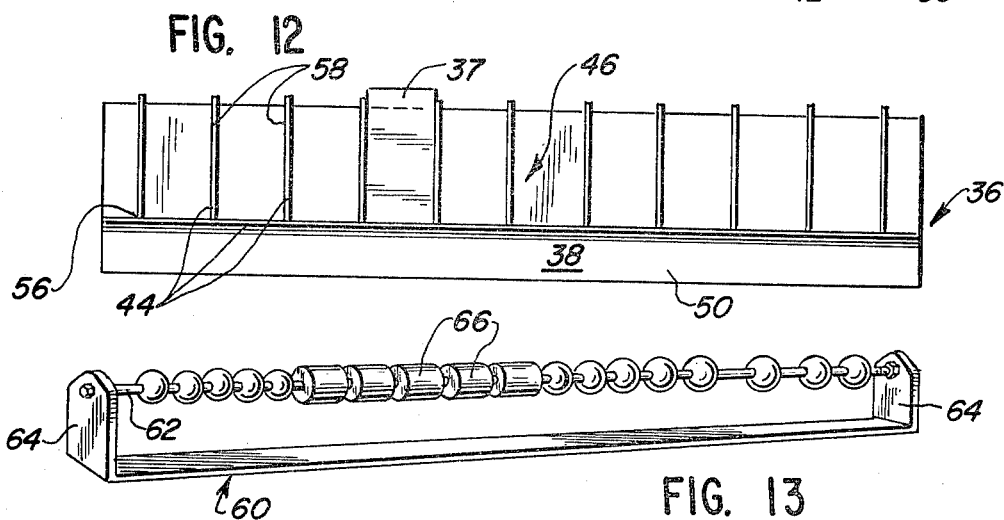
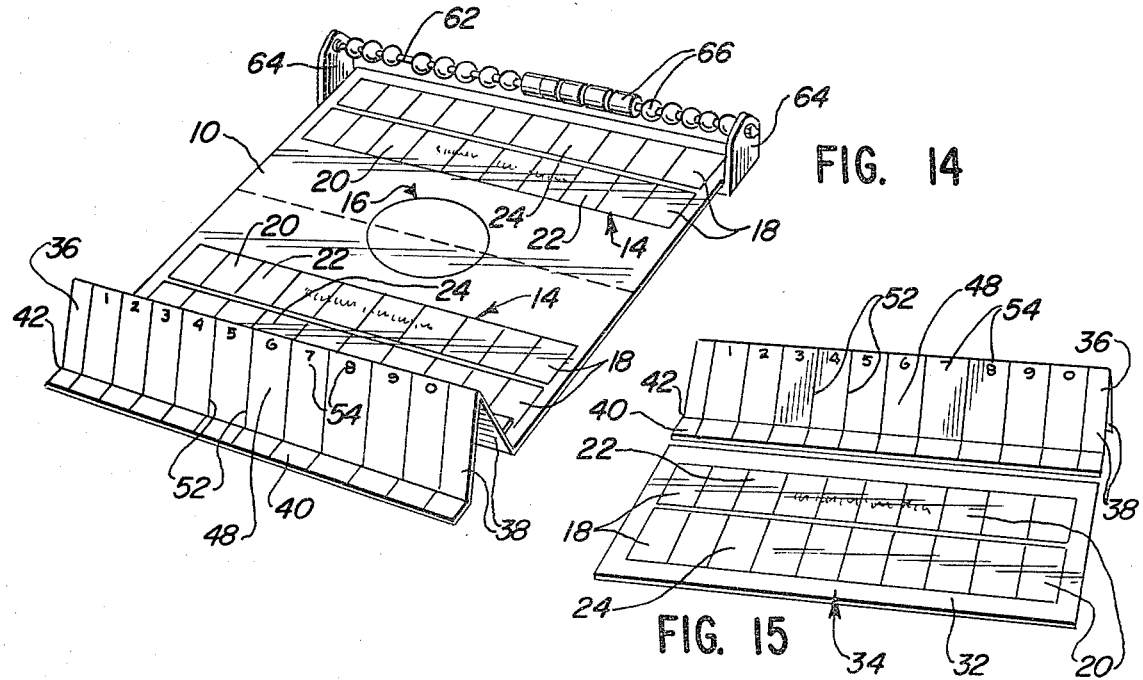

DIAGNOSTIC MEMORY SKILL GAME AND METHOD

BACKGROUND OF THE INVENTION

This invention relates to the field of educational games and more particularly to a method and apparatus for developing, improving, and diagnosing memory skills.

Groups of basic facts or concepts that must be committed to memory form the foundations upon which learning in any academic discipline is anchored. Thus, a person's acquisition of knowledge depends heavily upon that person's memory skills, i.e., the ability to perceive, understand, and retain important information. When a person's abilities are not responsive to the particular method being used to commit basic information to memory, that person is severely handicapped.

Many people have their own individual methods for memorizing which are best suited for their intellectual capabilities. Some people memorize best under traditional rote memorizing techniques, where repetitive visual or auditory stimuli are used. If you hear or see something enough times you may remember it. Other people use word associations to memorize. For example, a person using word associations to memorize will pair up concepts to be memorized with words already committed to memory. In this manner, that person is more likely to recall the associated concept when a word from the memorized list is retrieved from memory. This method is an intricate mental cross-referencing. A similar technique uses mnemonics, e.g., the first letter or initial sound is taken from each word or concept and is used to form a word or saying that is more easily memorized. "Every good boy deserves favor" is a mnemonic used to memorize the musical notes corresponding to the staff lines in the treble clef, E-G-B-D-F. "A red Indian thought he might eat tobacco in church" is a mnemonic used to memorize the spelling of arithmetic. These techniques are but examples of the countless ways individuals commit information to memory. Some techniques work for some people, but do not work for others.

One of the most challenging aspects of teaching in any educational institution, whether it be in a large classroom or a one-to-one tutorial situation, is to stimulate each student's memory. To accomplish this, a teacher must first get each and every student intensely interested in the learning activity. Since students' capabilities are widely diverse, a teacher must attempt to reach each student by communicating on many different levels at once. This multiple-level communication is seldom accomplished because some students are receptive to a particular method of teaching while others are not. Perhaps the most distressing results of this failure of communication is that the teacher is seldom able to diagnose problems early enough to easily correct them.

The lack of communication problem is particularly acute when the student is exercising memory skills. If the student is memorizing wrong information because of a misunderstanding, a misperception, or just the inability to process that information properly, the student is learning behavior that is most difficult to correct later. Thus, it becomes imperative that the teacher be able to diagnose incorrect memorization and prescribe a procedure for correction as soon as possible.

To stimulate student interest and provide tools for diagnosis, teachers have used many different techniques or methods. Educational games are frequently used to spur student interest because the lure of competition supplies the motivational drive to get the students involved. However, educational games frequently have the same or similar disadvantages in teaching memory skills encountered with other traditional teaching methods.

Educational games fall into basically three broad categories: board games, flash card games, and bingo-type games. Board games usually have dice or spinners, visually stimulating playing boards, and movable playing pieces. Each of these components vies for the student's attention bombarding the students with attractive visual stimuli. In a learning environment such as this, a student is frequently distracted from the task of memorizing information. Although the game itself provides the motivational impetus, the quality and quantity of memorization is significantly handicapped. Dice and spinners insert an element of chance into the game that have some desirable results but they usually interject less desirable aspects from a memorization standpoint. The element of chance is provided in most games to give the less skilled student the opportunity to win over a more advanced student. However, the less skilled student frequently gives up before the element of chance has an opportunity to work in his favor or he proceeds with the game only to have the element of chance destroy what confidence he had before the game. Additionally, the element of chance frequently punishes correct responses, for example, when the student encounters a "GO BACK 3 SPACES" or a "LOSE ONE TURN". Another disadvantage with most board games is that the game is played among students only. There is no person actively attempting to exhibit behavior for the students to model, and there is no opportunity for the teacher to diagnose what information is and is not being properly memorized.

Flash card games usually comprise a deck of cards with a question on one side and the correct response on the other or on a matching separate card. When flash cards are used in a classroom situation, several undesirable results occur. The teacher flashes a card and the more advanced students quickly respond. Incorrect responses are drowned out by the correct responses sounded, and some of the slower students do not respond at all. Though teacher's behavior exists on both the social and academic levels for the students to model, there is no opportunity for the teacher to diagnose the problems of each individual student. If the students take turns responding as each card is flashed, an acute stress factor enters into the game which frequently causes several students to lose interest in the game in order to avoid the stress. These disinterested students focus their attention elsewhere. Also, if this method is used, each student does not have the opportunity to respond to each card. Thus, neither the student nor the teacher can diagnose problems and it is only a matter of chance which card will be flashed on a student's turn. Another disadvantage to flash card games is that frequently in order to avoid the tedium of excessively repeating five or ten concepts to be memorized, too many cards are used. Although the more advanced student is able to master a large number of concepts, the less skilled student is often confused or becomes disinterested. A further disadvantage to most flash card games is that they are not structured to take advantage of the motivational drive created by the competitive nature of other types of educational games. This is because using flash cards is frequently little more than thinly disguised rote memorization where advanced students thrive on their successes and less skilled students give up because they cannot adequately compete. Using flash cards in a small group or one-to-one teaching situation eliminates some of the disadvantages that are encountered while using flash cards in a classroom situation. Nevertheless, flash card games remain deficient in creating student motivational drive and therefore, are severely handicapped tools for developing or diagnosing memory skills.

Bingo-type educational games usually comprise game cards with columns of possible responses, chips or tokens to cover these responses during the progress of the game, and randomly selected chips, tokens, or cards which have printed thereon the questions corresponding to the responses on the game cards. As with the educational board games, bingo-type games bombard the student with visual and auditory stimuli. As the teacher calls out a question, each student must assimilate that information and determine what response he is going to give. The student then scans his game card to see if his response is on the card. If the student's response is correct but is not on his card, he is being punished even though he made a correct response. If the student's response is incorrect yet the incorrect response is on his game card, he is being rewarded even though his response was incorrect. Since bingo-type educational games are usually only effective when played with several students, the teacher is seldom able to determine whether or not each student is responding correctly. Even if the teacher walks about the room during the time when responses are being formulated giving encouragement and helf where needed, the teacher cannot diagnose the problems of each student. One major disadvantage to bingo-type games is that the students cannot determine whether or not their responses are correct until someone wins the game, and then they only hear the responses without the questions. Thus, positive reinforcement for correct responses and negative reinforcement for incorrect responses is delayed, reducing the value of the game in developing memory skills. Another disadvantage is that the element of chance plays a major role in the game. Thus, even though a student may respond correctly to every question the responses may not appear on his game card or he may not win the game even though they do appear on his game card.

It is an object of the diagnostic educational game of this invention to provide a method by which students develop or improve their memory skills.

Another object of this invention is to provide an educational game that is so versatile that it is used for developing memory skills in many different disciplines and on many different advancement levels.

A further object of the present invention is to provide an educational game playing environment in which the teacher is in personal communication with each student player so that reinforcement is appropriately administered.

It is another object of the present invention to provide a diagnostic tool by which the teacher readily diagnoses and prescribes for each student's individual memory skill problems.

Still another object of the present invention is to provide an educational game playing environment not cluttered with excessive visual or auditory stimuli enabling the student to focus upon the information to be memorized.

A still further object of the present invention is to provide an educational game playing environment wherein competition is against the teacher rather than against fellow students thereby eliminating a stress factor associated with peer pressure.

Another object of the present invention is to provide an educational game playing environment wherein the teacher exhibits behavior for the students to model.

Other objects and advantages of the invention will become apparent upon reading the following detailed description and appending claims, and upon reference to the accompanying drawings.

SUMMARY OF THE INVENTION

The diagnostic educational memory skill game of this invention eliminates many of the disadvantages discussed above, and provides a method by which students develop or improve their memory skills. The game board is plain and relatively uncluttered, thereby reducing the impact of visual stimuli which a student must assimilate and thus enabling the student to focus on what is to be memorized. The number of bits of information to be memorized are preferably limited to ten or less so the student does not become confused. The game is conducted by a teacher who is in direct personal communication with each student. The teacher's presence provides each student with appropriate behavior to model, and also enables the teacher to appropriately reward correct responses, to give the correct response immediately while the student still has the question in mind, and, most importantly, to diagnose the problem areas for each student. The game of this invention eliminates the element of chance because each student must respond to each question and if he responds correctly to all questions, he wins.

The memory skill game apparatus of the present invention comprises a game board assembly, a plurality of question cards, and at least one bonus card. In an alternative embodiment, a plurality of center cards are used to assist in presenting the question to each student and to provide an informational constant for reinforcing memory. The game board assembly comprises a game board and extensions to the game board. The game board comprises a board with a pair of player areas disposed at opposite sides of the game board and a central common area. Each player area has a card distribution area comprising a pair of rows having preferably ten rectangular spaces corresponding to the size and shape of the question cards. The top row of spaces is the recycling areas whereas the bottom row of spaces is the mastered area. The extensions to the game board comprise individual player areas that may be disposed along the sides of the game board so that additional players may participate in the game.

The question cards and center cards have information printed thereon. The teacher occupies one player area and controls the pace of the game. The teacher selects an equal number of question cards for each player according to the skill level of the student players and the information that the teacher desires that the students memorize. The information on these question cards may relate to mathematics, spelling, language usage, foreign languages, history, or any other academic discipline. At least one bonus card is placed among the question cards, the purpose of which will be explained in more detail below. The teacher then shuffles the cards and begins the game by revealing information from the first question card to the first player. The teacher makes clear what type of response is to be elicited. For example, if the teacher reveals a question card with the number "3" printed thereon, and the teacher wants the student to identify the number, the teacher asks the question: "What number is this?" Of course, numerous other responses can be elicited by the teacher asking a different question. For example, if the teacher wants the student to add doubles, the question asked would be: "What is three plus three?"; if the teacher wants the student to multiply doubles, the question asked would be: "What is three times three?" If the student gives the correct response, the question card is placed in the student's mastered area. If the student gives an incorrect response, the question card is placed in the student's recycling area. The teacher immediately gives positive reinforcement of praise or encouragement or corrects an incorrect response so that the student knows exactly what response was considered correct in order that the student may later respond correctly to the same question. The game proceeds from player to player and last to the teacher. The second question round and each subsequent round are conducted in the same manner as the described first round, except if a question card is presented to the student and the student has previously responded to the identical card, then the student must again respond. The position of the question card in the student's player area is repositioned in accord with the student's second response. Regardless of the accuracy of the student's response, another question card is shown to the student. This process is repeated until the student is shown a question card which has not previously been presented to that student. Assuming that the teacher knows all the correct responses without any informational aid, this is usually the case, a student must respond correctly to each and every question in order to place a complete set of unique question cards in the mastered area before the teacher does so.

If the bonus case is revealed on a player's turn, that player must give fresh responses to questions asked relating to each card in his playing area. Each correct response for question cards in the recycling area entitles the student player to place those cards in the mastered area. However, each question card for which an incorrect response is given must be placed in that player's recycling area whether or not it was in the recycling area before the bonus card was drawn. The use of the bonus card interjects two factors into the game. First, it enables a player to correct his previous mistakes and complete the game before the teacher even though an incorrect response was given during some earlier stage of the game. Thus, the motivational drive created by the game does not die if a student gives one or more incorrect responses. Second, the bonus card requires that the student retain the information throughout the course of the game because the student may be called on to respond to any given question more than once, thus reinforcing the information committed to memory.

In addition, if the student responds correctly to all questions in a bonus situation, the student is given a chip or token to signify this accomplishment. Likewise, each student who completes the game before the teacher by obtaining a complete set of question cards in the mastered area before the teacher does so also receives a chip or token. These chips or tokens may be used to determine an ultimate winner, or they may be used to purchase an award thereby positively reinforcing the collective behavior of responding correctly to each question.

In an alternative embodiment, center cards are placed in the central common area during the course of the game, and they serve as additional information to be used in conjunction with each question card and as additional stimuli for assisting the student in focusing on the question asked. The center cards interject an informational constant into each question. For example, if a center card has the number "2" printed thereon, it may be used to represent an addend or subtrahend. Thus, if the question card bears the number "5", the teacher may ask: "What is five plus two?" or "What is five minus two?" If a center card has " an" printed thereon, it may be used to represent the ending of a word. Thus, if question cards having the letters "v", "c", and "p" printed thereon are drawn, the teacher may require the student to respond by saying the words "van", "can", and "pan".

The direct personal communication between student player and teacher enables the teacher to immediately diagnose problem areas and prescribe for each student player's needs. If a student gives an incorrect response, the teacher is in a position to immediately discover why the student gave an incorrect response. The teacher then corrects the student's misunderstanding or misperception. In this manner, the student experiences progressive achievement in developing and improving memory skills and avoids the difficult task of erasing and correcting mismemorized concepts.

The educational memory skill game of the present invention further comprises an information easel, a number line, or an abacus rod. The information easel is used to display to the teacher informational cards having unfamiliar material printed thereon. Thus, for example, a teacher using the information easel may teach a foreign language even though that teacher is not intimately familiar with the language. The information easel may also be used to display informational cards out of a student's view so that the student may play the game of this invention alone to reinforce memory skills acquired while playing against the teacher. The number line or abacus rod may be used to assist the student player in performing simple arithmetic problems until the student can respond correctly without mechanical assistance.

BRIEF DESCRIPTION OF THE DRAWINGS

For a more complete understanding of this invention, reference should now be made to the embodiments illustrated in greater detail in the accompanying drawings and described below. In the drawings:

FIG. 1 is a top plan view of the game board showing a pair of player areas with a central common area therebetween;

FIG. 2 is a top plan view of an extension to the game board showing a player area;

FIG. 3 is a top plan view of a game board showing a pair of extensions disposed abutting the lateral peripheral edges of the game board and a center card disposed on the central common area;

FIGS. 4, 5, and 6 are plan views of the center cards showing examples of what information may be printed thereon;

FIGS. 7, 8, and 9 are plan views of question cards showing examples of what information may be printed thereon;

FIG. 10 is a plan view of a bonus card;

FIG. 11 is a perspective view of an easel showing a response card disposed on the easel's front face in the number four position;

FIG. 12 is an elevational view of an easel showing its back face and a response card disposed in the number seven position;

FIG. 13 is a perspective view of an abacus rod;

FIG. 14 is a perspective view of a game board showing an example of a possible disposition of an easel and an abacus rod with relation to a game board; and FIG. 15 is a perspective view of a game board extension showing an example of a possible disposition of an easel for use by a player while practicing the teachings of this invention alone.

DESCRIPTION OF THE PREFERRED EMBODIMENT

Referring now to the drawings, the memory skill game apparatus of the present invention comprises a game board 10 and a plurality of cards 12 which are used in conjunction with the game board 10 to develop or improve memory skills.

As shown principally in FIGS. 1 and 14, the game board 10 has a substantially rectangular flat playing surface and comprises a pair of player areas 14 and a central common area 16. Each player area 14 is disposed adjacent opposite peripheral edges of the game board 10 so that the common area 16 is disposed therebetween. A player area 14 comprises a pair of rows 18 with substantially rectangular spaces 20. While looking toward the central common area 16 of game board 10, the top row 18 defines a recycling area 22 and the bottom row 18 defines a mastered area 24. Although the recycling and mastered areas 22 and 24 may have any number of spaces 20, it is preferred that they each have ten spaces 20. The plurality of cards 12 have information printed thereon and comprise question cards 26, center cards 28, response cards 37, and bonus cards 30. The question cards 26, as shown in FIGS. 7-9, are of size and shape substantially similar to each space 20 in the recycling and mastered areas 22 and 24.

The information printed upon the question cards 26 is designed to suggest questions to a teacher conducting the game and to serve as visual stimuli upon which a student player may focus his attention while formulating his answer to the teacher's question. The information may suggest questions relating to any academic discipline or any other matter to be memorized. Thus, the question cards 26 provide the game with wide versatility. The number of informational question cards 26 is a matter of discretion and can be varied to accommodate the learning level of the student players. The bonus card 30 has the same size and shape as the question cards 26 and bears the word "BONUS" or words conveying the same concept. The number of bonus cards 30 is also a matter of discretion, but in the preferred embodiment equals the number of student players. The center cards 28, as shown in FIGS. 4-6, are round and designed to be disposed upon the common area 16 of the game board 10. Although the center cards 28 are illustrated as, and it is preferred that they be round, it should be understood that other sizes and shapes may be used for the center cards 28. The information printed upon the center cards 28 is designed to assist a teacher in conducting the game and student players by providing an informational constant to the questions the teacher asks as well as a second visual stimuli upon which the student player may focus his attention. For example, if a center card 28 bearing the number "2" is placed upon the common area 16, the teacher conducting the game will formulate each question so that it relates to the number "2". A further explanation of the use of the plurality of cards 12 is given below in the description of the method of this invention.

In addition to the game board 10, an alternative embodiment of the memory skill game apparatus further comprises extensions 32 to the game board 10, as shown separate from the game board 10 in FIGS. 2 and 15 and in conjunction with the game board 10 in FIG. 3. Each extension 32 comprises a player area 34 identical to a player area 14 of the game board 10. Since extension player areas 34 and game board player areas 14 are identical, like components will bear like reference numerals. By adding extensions 32 to the game board 10, as shown in FIG. 3, for example, the memory skill game will accommodate more players.

FIGS. 11, 12, 14 and 15 illustrate still another alternative embodiment of the memory skill game apparatus which further comprises an easel 36 for displaying question cards 26 and response cards 37 bearing responses to questions to be asked. The configuration of the preferred easel 36 comprises an inverted "V" structure 38 with a base lip 40 formed unitary with said "V" structure 38 and running along its front base 42 and an assembly of ribs 44 which form compartments 46 within which question cards 26 (not shown) and response cards 37 may be displayed. The inverted "V" structure 38 defines a front face 48 and a back face 50. The front face 48 is divided by lines 52 and numerals 54 to facilitate the display of responses and question cards 26. The back face 50 supports the assembly of ribs 44 which comprises a base rib 56 which runs the length of the back face 50 and a plurality of side ribs 58 which extend vertical of the base rib 56 creating the compartments 46. The compartments 46 are sized to accommodate the display of question cards 26 and response cards 37 as shown in FIG. 12 and the side ribs 58 on the back face 50 register with the lines 52 of the front face 48. The easel 36 may have any number of compartments 46, but ten is preferred so that the number of compartments 46 will correspond to the number of spaces 20 in each row 18 of the game board 10. Although the easel 36 as described above is a preferred embodiment, it should be understood that other easels or other means for displaying question cards 26 may be used. Examples of the disposition of an easel 36 with respect to a game board 10 and an extension 32 of the game board 10 are illustrated at FIGS. 14 and 15.

Another alternative embodiment of the memory skill game apparatus further comprises an abacus rod 60, as shown in FIG. 13. The abacus rod 60 comprises a rod 62 extending between and attached to a pair of uprights 64 with a plurality of beads 66 mounted slidably thereon. The abacus rod 60 serves as a mechanical teaching aid for student players of the game. An example of the disposition of an abacus rod 60 with respect to a game board 10 is illustrated at FIG. 14. It should be noted that a number line printed upon the game board 10 may serve the same purpose as the abacus rod 60.

The present invention is also concerned with a method for teaching memory skills and diagnosing difficulties which are facilitated in memorization by the memory skill game apparatus. The teach who is to conduct the game selects a plurality of question cards 26 which convey information representing the concepts the student players are to memorize. An equal number of question cards 26, usually not exceeding ten, is selected for each player including the teacher. Although more than ten question cards per player may be used, the limited number is preferred because memorization is best accomplished by focusing on a limited number of concepts at a time. In a preferred embodiment of the method, one or more bonus cards 30 are placed among the selected question cards 26, however, the game may be played without bonus cards 30.

The memory skill game begins when the teacher reveals the first question card 26 to the first student player. The teacher orally asks the student player a question relating to the revealed question card 26 which incorporates the concept the teacher wishes the student to memorize. For example, if the teacher wanted the student to recognize and memorize the arabic numerals. The teacher would reveal a question card with a numeral printed thereon and would ask: "What number is this?" If the student player makes an acceptable response to the question asked, the teacher may orally commend the student and then repeats the correct response, thus, awarding and reinforcing acceptable behavior. The question card 26 is then placed in that player's mastered area 24. If the student player makes an unacceptable response to the question asked, the teacher corrects the error by giving the correct response and places the question card 26 in that player's recycling area 22. The game proceeds in this manner from player to player and last to the teacher until one round of questions is completed.

It is presumed that the teacher is knowledgeable in the academic subject matter and will therefore not incorrectly reply to questions. In subsequent rounds, if the student player is shown a question card 26 which is identical to a question card 26 already within the student's recycling area 22 or mastered area 24, the student must nevertheless respond. If the response is correct, another question card 26 is shown to the same student player until a question card 26 bearing information not previously responded to is reached. When several student players are involved in the game, the above repeat sequence frequently occurs and in each instance provides the student player with positive reinforcement of the already mastered concept thereby building confidence. If the student player gives an incorrect response to a question card 26 when the same question card 26 is in the student's mastered area 24, then the question card 26 in the mastered area 24 is shifted into the student's recycling area 22. This process enables the teacher to evaluate the performance of the student player to repeated stimulus and to determine if the student player has actually memorized the subject matter contained on the question cards 26.

The second and all subsequent rounds until all of the question cards 26 have been revealed are conducted similarly. The objective for each player in the game is to make acceptable responses so that each unique question card 26 is disposed within his mastered area 24 before the teacher does likewise. The challenge of competing against the teacher provides the motivational drive which retains student interest.

When a bonus card 30 is revealed to a student player, he has the opportunity to correct all of his previous unacceptable responses. He also must give fresh acceptable responses to questions for which he had previously given acceptable responses. For example, if a student player, upon being dealt a bonus card 30, had two question cards 26 in his recycling area 22 and three in his mastered area 24, he would be required to make a fresh response to each of the questions asked relating to each of the five cards. The teacher again commends the student for correct responses and repeats each correct response and places the subject question card 26 in the player's mastered area 24. The teacher also corrects any unacceptable responses by giving the correct response and places the subject question card 26 in the student's recycling area. The question cards 26 are repositioned in accordance with the student's current responses regardless of whether or not they were in the recycling area 22 or the mastered area 24 before the bonus card 30 was dealt. Thus, when bonus cards 30 are incorporated into the game, motivational drive for the student player by the game is not eliminated when the student makes a mistake because there is still an opportunity to redeem errors.

The basic format of game procedure described above provides more than an educational game playing environment wherein students are motivated by the game while developing memory skills. It also provides a framework around which the teacher views student player responses and the final position of question cards 26 in the student's mastered area 24 and recycling area 22 provides diagnostic information for the teacher. Furthermore, since question cards 26 are selected so that the questions asked relating thereto elicit responses within the student's capabilities, the teacher may effectively provide positive or negative reinforcement for the responses given. Additionally, the format of the game provides a means by which the teacher can diagnose and prescribe for problem areas in memorization and correct mismemorization. The teacher can pinpoint problem areas by noting which question cards 26 are placed in a student's recycling area 22 and whether or not he is able to correct his previous response when he is dealt a bonus card 30. The game format also provides a means by which development of memory skills may span a plethora of academic disciplines. By selecting question cards 26 bearing information relating to a particular discipline, the teacher focuses the student's attention upon that discipline. If the teacher wishes to change the focus to another discipline the teacher selects another set of question cards 26 bearing information relating to the new discipline.

In another embodiment of the present invention, center cards 28 may be used to interject more versatility into the method for developing memory skills. When a center card 28 is disposed in the common area 16, an informational constant is established from which the teacher formulates questions relating to both the center card 28 and the dealt question card 26. For example, if the center card 28 of FIG. 4 bearing the number "2" is placed as shown in FIG. 3, the teacher uses the number "2" as a constant in each question asked. When a question card 26 bearing the number "4" is dealt, the teacher may ask: "What is 4 plus 2?" or "What is 4 times 2?" Likewise, if a center card 28 bearing "st" as shown in FIG. 6 is placed in common area 16, a teacher inquiring about the question cards 26 in FIG. 9 may ask a student to pronounce the words "stove", "stay", or "stop". The center card 28 may be placed upon a turntable apparatus to facilitate the rotation of the center card 28 so that it appears upright to the student responding to the related question.

In another embodiment of the present invention, the versatility of the memory skill game of this invention is further expanded by using an easel 36 as illustrated in FIGS. 11, 12, 14 and 15. By using an easel 36, the teacher may assist the student players in memorizing information with which the teacher is unfamiliar. The teacher displays the response cards 37 bearing responses to the questions he will ask on the easel 36 so that the student players cannot see the responses, then the game proceeds as if the teacher is familiar with the topic. Also, by using an easel 36, a student playing alone may practice and improve memory skills. After playing the memory skill game with a teacher so that a proper diagnosis is made, a student may reinforce concepts memorized or concentrate on troublesome concepts by conducting the game alone. The correct responses are placed on the back face 50 of the easel 36 so that responses are not visible to the player. A response card 37 corresponds to each question card 26 selected for the game. A visible reference symbol is used to match each question card 36 to the appropriate response card 37. The game proceeds as if a teacher were conducting its progress except the student reveals each question card 26 seriatim, asks and answers the questions suggested by each question card 26, and checks the appropriateness of his responses by matching the question and response cards 26 and 37 and examining the proper response from the easel 36. The student also arranges and rearranges the question cards 26 within the student's recycling and mastered areas 22 and 24 according to the acceptability of the student's responses.

While particular embodiments of the invention have been shown, it is to be understood that the invention is not limited thereto since modifications may be made by those skilled in the art, particularly in light of the foregoing teachings.

What is claimed is:

1. An educational memory skill board game apparatus for use in developing and improving memory skills comprising:
    a substantially rectangular game board having a flat top playing surface comprising:
        a pair of player areas disposed adjacent mutually opposite peripheral edges of said game board;
        each of said player areas having a first row of rectangular spaces and a second parallel row of rectangular spaces; and,
        a common area disposed centrally upon said game board and between said player areas;
    a plurality of informational cards of size and shape corresponding to each of said rectangular spaces with information printed thereon; and,
    a plurality of center cards with supplemental information printed thereon for disposing on said common area of said game board; said supplemental information printed on said center cards correlates with and is complementary to said information printed on said informational cards.

2. A memory skill board game apparatus as set forth in claim 1 further comprising a bonus card of size and shape substantially similar to said informational cards.

3. A memory skill board game apparatus as set forth in claims 1 or 2 further comprising an extension to said game board comprising a substantially rectangular player area having a flat top playing surface and said extension is disposed with respect to the game board player areas along a lateral peripheral edge of said game board.

4. A memory skill board game apparatus as set forth in claims 1 or 2 further comprising an abacus rod disposed along a peripheral edge of said playing area of said game board and having beads slidably mounted upon said rod.

5. A memory skill board game apparatus as set forth in claims 1 or 2 further comprising a support structure for holding said informational cards substantially upright so that the information printed on said informational cards is seen when viewing the structure from one direction, but is not seen when viewing the structure from the opposite direction.

6. A method for developing memory skills in an educational game playing environment where a teacher conducts the game, which comprises the steps of:
    (a) selecting for each player of the game, including the teacher, an equal number of informational cards with information to be memorized printed thereon;
    (b) revealing one informational card to each player seriatim with the teacher being the last player to have a card revealed;
    (c) asking a question relating to the revealed informational card to elicit a response from the player to whom the informational card is revealed before revealing the next informational card;
    (d) determining the acceptability of said questioned player's response by comparing the player's response to the response the teacher considers to be correct;
    (e) repeating the considered correct response;
    (f) placing the revealed informational card on a space of a game board designated to be within the mastered area for said questioned player if said player's response is acceptable.
    (g) placing the revealed informational card on a space of said game board designated to be within the recycling area for said questioned player if said player's response is not acceptable;
    (h) if the informational card revealed is identical to an informational card already positioned within that player's recycling area or mastered area, repeating a question asked of a player, and shifting the positioned informational card according to the acceptability of the player's response, and then revealing the next informational card to the same player;
    (i) repeating step (h) until the informational card revealed to the player is different than the informational cards positioned within that player's recycling area and mastered area;
    (j) proceeding to reveal informational cards and ask questions of each player and place informational cards according to the acceptability of the player responses until all of the unique selected informational cards have been revealed and placed and a question for each card has been asked.

7. A method for developing memory skills as set forth in claim 6 wherein the method further comprises the steps of:
    (a) diagnosing each player's memory skill deficiencies by examining and recording which cards have been placed in each player's recycling area during the course of the game and examining and recording the final position of the informational cards in each player's mastered area and recycling area;
    (b) prescribing for each player's memory skill needs by selecting informational cards for subsequent performances of the method and correcting memorization errors and diagnosed deficiencies.

8. A method for developing memory skills as set forth in claims 6 or 7 wherein a bonus card is disposed among the selected informational cards and when the bonus card is revealed to a player, the method further comprises the steps of:
  (a) asking a question relating to each informational card in said player's recycling and mastered areas seriatim to elicit a response from the player;
  (b) determining the acceptability of said questioned player's response by comparing the player's response to the response the teacher considers to be correct;
  (c) rearranging each informational card within said player's player area according to the acceptability of said player's individual responses, if acceptable then within said player's mastered area, if not acceptable then within said player's recycling area; and,
  (d) repeating steps (b)-(j) set forth in claim 6.

9. A method for developing memory skills as set forth in claims 6 or 7 wherein each question asked of a player also relates to the information printed on a center card disposed in a common area of said game board.

10. A method for improving memory skills in an educational game playing environment where a student conducts the game alone, which comprises the steps of:
  (a) selecting informational cards with information to be memorized printed thereon;
  (b) placing informational cards bearing responses to corresponding informational cards bearing questions upon an easel so that the response thereon is not visible to the student;
  (c) revealing each informational card bearing a question seriatim;
  (d) asking said question relating to the revealed informational card;
  (e) responding to each question;
  (f) determining the acceptability of each response by matching the appropriate informational card bearing the response to the informational card bearing the question and comparing response given to the response considered to be correct;
  (g) placing the revealed informational card on a space within the mastered area of a game board if the response is acceptable;
  (h) placing the revealed informational card on a space within the recycling area of a game board if the response is not acceptable; and,
  (i) proceeding to reveal informational cards until all selected informational cards have been revealed and a question has been asked and answered relating to each informational card.

* * * * *